(12) United States Patent
Wieczorek et al.

(10) Patent No.: US 9,012,854 B2
(45) Date of Patent: Apr. 21, 2015

(54) OPTIMIZED SCINTILATOR CRYSTALS FOR PET

(75) Inventors: Herfried Karl Wieczorek, Aachen (DE); Andreas Thon, Aachen (DE); Steven Cooke, Garfield Heights, OH (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/116,374

(22) PCT Filed: Apr. 26, 2012

(86) PCT No.: PCT/IB2012/052096
§ 371 (c)(1),
(2), (4) Date: Nov. 8, 2013

(87) PCT Pub. No.: WO2012/153223
PCT Pub. Date: Nov. 15, 2012

(65) Prior Publication Data
US 2014/0084170 A1   Mar. 27, 2014

Related U.S. Application Data

(60) Provisional application No. 61/485,138, filed on May 12, 2011.

(51) Int. Cl.
*G01T 1/202* (2006.01)
*G01T 1/29* (2006.01)
*G01T 1/20* (2006.01)

(52) U.S. Cl.
CPC ......... *G01T 1/2985* (2013.01); *Y10T 29/49826* (2015.01); *G01T 1/2002* (2013.01); *G01T 1/202* (2013.01)

(58) Field of Classification Search
CPC ....................................................... G01T 1/202
USPC ........................................................... 250/362
See application file for complete search history.

(56) References Cited

U.S. PATENT DOCUMENTS 3,825,758 A   7/1974  Miraldi
4,870,280 A   9/1989  Yamashita et al.
(Continued)

FOREIGN PATENT DOCUMENTS

JP   57194374 A   11/1982
WO   2009024895 A2   2/2009

OTHER PUBLICATIONS

Janecek et al., "Simulating Scintillator Light Collection Using Measured Optical Reflectance" IEEE Transactions on Nuclear Science, vol. 57, No. 3, Jun. 2010, pp. 964-970.
Vandenbroucke et al., "Study of Scintillation Crystal Array Parameters for an Advanced PET Scanner Dedicated to Breast Cancer Imaging" 2008 IEEE Nuclear Science Symposium Conference Record, pp. 4914-4919.
Shoa et al., "Dual APD Array Readout of LSO Crystals: Optimization of Crystal Surface Treatment" IEEE Transactions on Nuclear Science, vol. 49, No. 3, Jun. 2002, pp. 649-654.
(Continued)

*Primary Examiner* — David Porta
*Assistant Examiner* — Hugh H Maupin

(57) ABSTRACT

When employing specular reflective material in a scintillator crystal array, light trapping in the crystal due to repetitive internal reflection is mitigated by roughening at least one side (16) of each of a plurality of pre-formed polished scintillator crystals. A specular reflector material (30) is applied (deposited, wrapped around, etc.) to the roughened crystals, which are arranged in an array. Each crystal array is coupled to a silicon photodetector (32) to form a detector array, which can be mounted in a detector for a functional scanner or the like.

21 Claims, 8 Drawing Sheets

(56) References Cited

U.S. PATENT DOCUMENTS

| | | | |
|---|---|---|---|
| 5,091,650 | A | 2/1992 | Uchida et al. |
| 5,227,634 | A | 7/1993 | Ryuo et al. |
| 5,610,401 | A | 3/1997 | Kuwabara et al. |
| 7,355,180 | B2 | 4/2008 | Tonami et al. |
| 2004/0232343 | A1* | 11/2004 | Schmand et al. ............ 250/368 |
| 2010/0040197 | A1* | 2/2010 | Maniawski et al. ............ 378/65 |
| 2010/0148074 | A1* | 6/2010 | Menge et al. ................. 250/362 |
| 2010/0270462 | A1* | 10/2010 | Nelson et al. ............ 250/252.1 |
| 2010/0288936 | A1 | 11/2010 | Call |

OTHER PUBLICATIONS

Saoudi et al., "Study of Light Collection in Multi-Crystal Detectors" IEEE Transactions on Nuclear Science, vol. 47, No. 4, Aug. 2000, pp. 1634-1639.

Spanoudaki et al., "Investigating the temporal resolution limits of scintillation detection from pixellated elements: comparison between experiment and simulation" Phy. Med. Biol. 56 (2011), pp. 735-756.

* cited by examiner

OPTIMIZED SCINTILATOR CRYSTALS FOR PET

CROSS REFERENCE TO RELATED APPLICATIONS

This application is a national filing of PCI application Serial No PCT/IB2012/052096, filed Apr. 26, 2012, published as WO 2012/153223 A1 on Nov. 15, 2012, which claims the benefit of U.S. provisional application Ser. No. 61/485,138 filed May 12, 2011, which is incorporated herein by reference.

The present application finds particular application in positron emission tomography (PET) imaging systems. However, it will be appreciated that the described technique may also find application in single photon emission computed tomography (SPECT) and other diagnostic systems, other imaging systems, or other imaging techniques.

PET, SPECT, and other radiation-based medical imaging modalities share a common need for compact and robust radiation detector modules. In the past, SPECT and PET radiation detector modules have typically included an array of photomultiplier tubes (PMTs) optically coupled with scintillator crystals using an intermediate light guide layer. The scintillator crystal converts the absorbed radiation particle into a light burst which is detected and localized by the photomultiplier tubes using Anger logic. In some radiation detection systems, the photomultiplier tubes have been replaced by photodiodes that produce an analog signal proportional to the intensity of the light bursts. Photodiodes offer a cost-effective, low voltage alternative to photomultiplier tubes in high light situations. Silicon photomultipliers (SiPM) detectors have been developed which incorporate the high gain and stability of photomultiplier tubes along with the cost-effective, low voltage nature of the analog photodiodes.

Current PET systems are built from arrays of LYSO (lutetium-yttrium oxy-orthosilicate) crystals covered individually with PTFE tape to prevent optical loss and crosstalk between crystals. Crosstalk, however, is of the order of 10% into neighboring pixels through these thin diffusive reflector layers. For solid-state detectors, better reflectors are desirable to reduce crosstalk and restrict readout to a very low number of detector pixels, necessary because of the dark count rate of such detectors.

The present application relates to new and improved systems and methods that facilitate improving scintillator crystal performance, which overcome the above-referenced problems and others.

In accordance with one aspect, a radiation detector array for a nuclear scanner includes at least one array of scintillator crystals, each crystal having at least one treated surface, which is treated to scatter incident light, a reflector layer wrapped around each scintillator crystal, and at least one photodetector coupled to each array.

In accordance with another aspect, a method of increasing light detection in a detector array includes roughening at least one side of each of a plurality of pre-formed polished scintillator crystals, applying a reflector material to the roughened crystals, and arranging the crystals in an array. The method further includes optically coupling each of a plurality of arrays to an array of photo detectors to form a detector array, and mounting the detector array in a detector module.

In accordance with another aspect, a method of increasing light detection in a functional scanner detector array includes receiving radiation at one or more scintillation crystals, each crystal having a roughened side, and converting the radiation into light in the crystal. The method further includes mitigating repetitive internal light reflection in the crystal such that internal reflection is reduced by reflection of the light off of the roughened side, converting the light into electrical signal, converting the electrical signal into digital data; reconstructing the electrical signal into an image, and displaying the reconstructed image.

One advantage is that photon detection is improved.

Another advantage resides in increasing scintillator light output efficiency.

Still further advantages of the subject innovation will be appreciated by those of ordinary skill in the art upon reading and understanding the following detailed description.

The innovation may take form in various components and arrangements of components, and in various steps and arrangements of steps. The drawings are provided for purposes of illustrating various aspects and are not to be construed as limiting the invention.

When all of the sides of a scintillator crystal are mirror-reflective, light can become trapped bouncing back and forth or among the side walls, and not exit the scintillator. For example, when employing mirror reflectors with rectangular crystals, light can become trapped in the resulting reflector structure. In such cases, only a fraction of the photons generated in the crystal are transmitted into the detector that is optically coupled to the bottom surface of the scintillator which is not covered by the reflector. A major part of the light can be "infinitely" reflected on helical trajectories between the other five of the six surfaces of the crystal, due to total reflection inside the crystal (n×1.82). The subject innovation overcomes the aforementioned problems by roughening or abrading one or more surfaces of a scintillator crystal used in a PET detector scintillation crystal array.

Figure 1:
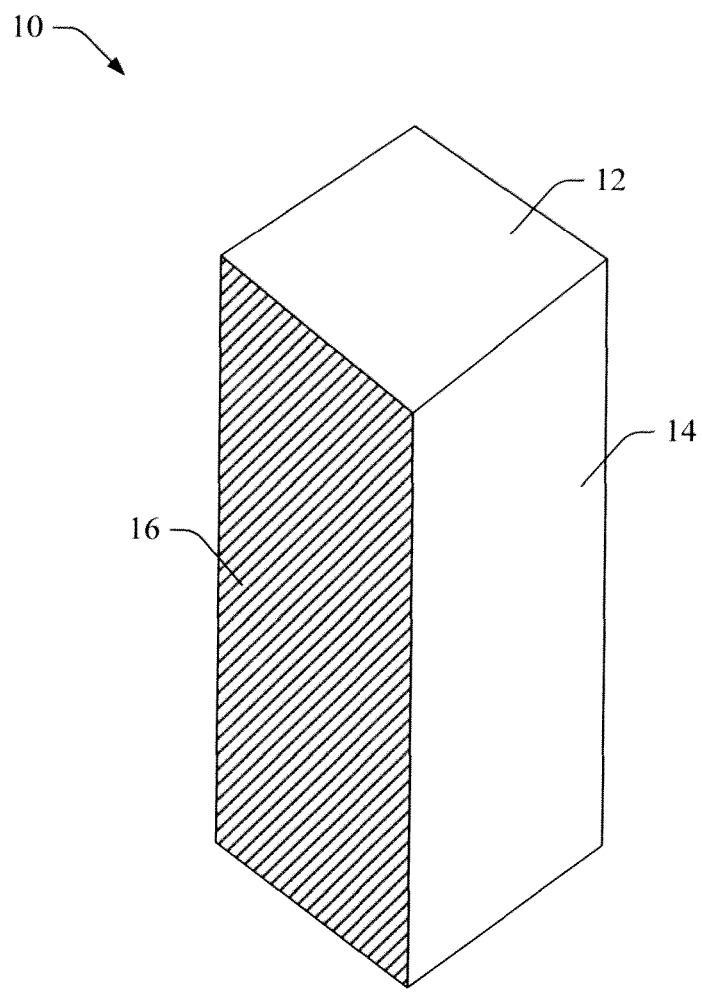
FIG. 1 illustrates a scintillator crystal that facilitates mitigating light trapping occurrences in the crystal, in accordance with one or more aspects described herein.

FIG. 1 illustrates a scintillator crystal 10 that facilitates mitigating light trapping occurrences in the crystal, in accordance with one or more aspects described herein. For instance, once a photon enters a scintillation crystal, it may be internally reflected from a sidewall of the crystal. Roughening of one or more surfaces (e.g., top, bottom, or side) reduces the trapping of optical photons in such reflector structures. While the light output of polished scintillator crystals with surrounding reflectors decreases strongly with increasing crystal length, the grinding of one side surface increases the light output of long (e.g., having an aspect ratio of approximately 1.5:1 or greater, 2.5:1 or greater, 3.5:1 or greater, etc.) crystals by approximately 25%, up to a value achievable with much shorter crystals. Longer crystals have more radiation-stopping capacity and are particularly advantageous for high energies, such as those employed in PET.

The crystal 10 includes a top surface 12, a bottom surface (not visible in FIG. 1) opposite the top surface and which faces a subject being scanned, and four side surfaces 14. One of the side surfaces is a roughened surface 16 in FIG. 1. However, it will be appreciated that the roughened surface is not limited to being a side surface but rather may be a top or bottom surface. The described techniques employ a rough (grinded, abraded, chemically etched, sand blasted, etc.) scintillator top, side, or bottom surface for efficient collection of light from the scintillator crystals. In one embodiment, light output is improved by grinding with SiC-150 paper, regardless of the direction of grinding.

In one embodiment, the scintillation crystal is Lutetium Yttrium Oxy-Orthosilicate (LYSO). Other scintillators such as Lutetium Oxy-Orthosilicate (LSO), Lutetium Gadolinium Oxy-Orthosilicate (LGSO), Lutetium Gadolinium Yttrium Oxy-Orthosilicate (LGYSO), or the like are also contemplated. A less dense scintillator such as Lanthanum Bromide (LaBr), or a higher density scintillator such as a Bismuth Germanate (BGO) scintillator can be employed as well.

The roughened crystals 10 can be employed in an array, such as in a functional scanner detector. In general, crystal length is a function of scintillation material stopping power. For instance, when using a LYSO scintillation material for PET, 10-25 mm long crystals may be employed. When using a LaBr scintillation material, 20-35 mm crystals may be employed. In another example, 5-20 mm long crystals are employed when a BGO scintillation material is used. It will be appreciated that the foregoing examples of crystal lengths are illustrative in nature, and intended to illustrate that as scintillator stopping power increases, the crystal length can be decreased.

In one embodiment, the crystals are polished smooth and then roughened on one side. Roughening can be performed by sanding, grinding (wet or dry), cutting or sawing with a wire saw or the like, sandblasting, depositing additional crystal material on one side (e.g., sputtering), or any other suitable technique. In another embodiment, instead of polishing the crystals on all sides and roughening one side, the crystals could be polished on five sides only and left rough from initial cutting on the sixth face.

In another embodiment, the crystals are polished smooth and arranged in an array. Once positioned in the array, the top surfaces or bottom surfaces of all crystals are roughened.

Figure 2:
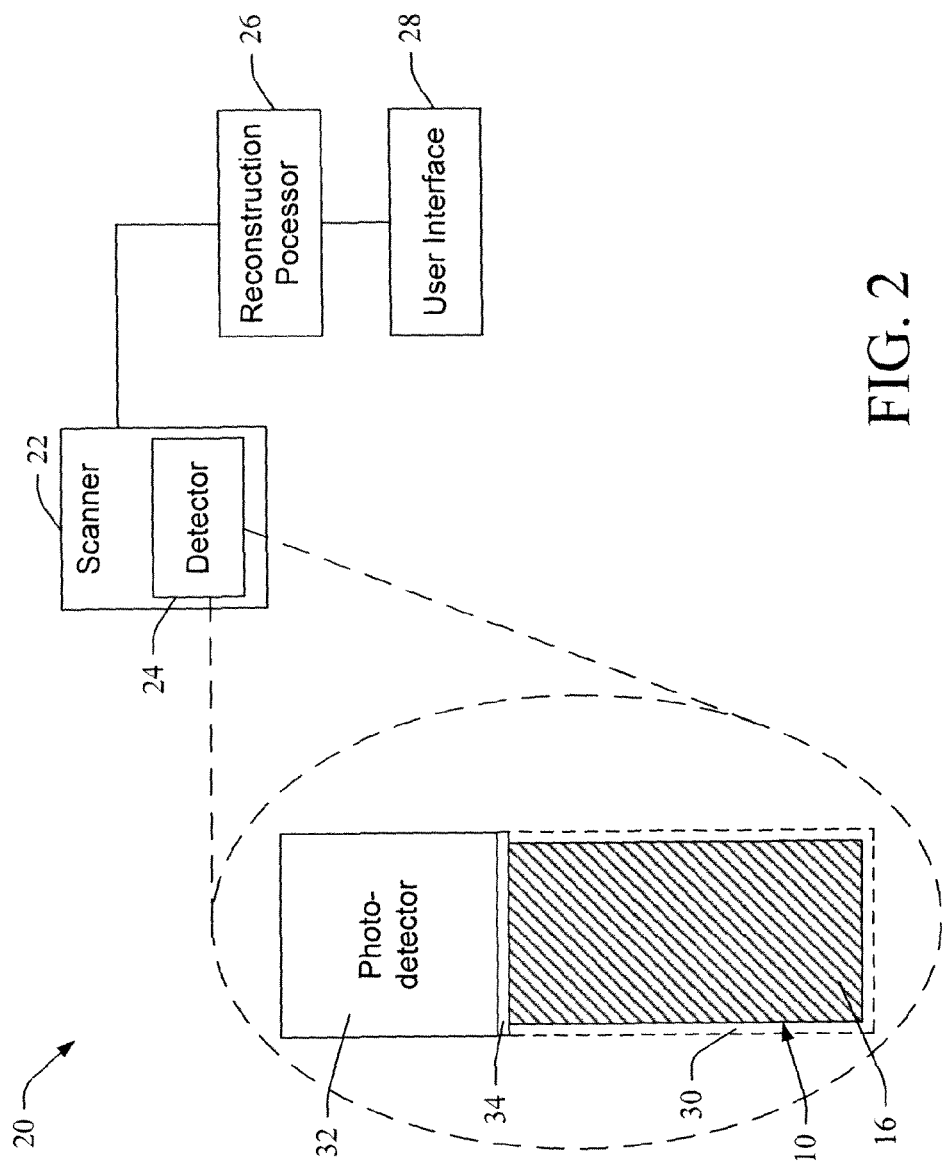
FIG. 2 illustrates a system that employs the roughened scintillator crystal, in accordance with various aspects described herein.

FIG. 2 illustrates a system 20 that employs the roughened scintillator crystal 10, in accordance with various aspects described herein. The system includes a scanner 22 (e.g., PET, SPECT, a multi-modal scanner, etc.) having one or more detector modules 24 that detect events that are reconstructed by a reconstruction processor 26 into an anatomical image that is presented or otherwise output to a viewer on a user interface 28 such as a monitor on a computer, a workstation, or the like. The detector 24 includes an array of roughened scintillator crystals 10, although for illustrative purposes only one roughened crystal 10 is shown, with the roughened surface 16 facing out of the plane of the page. In one embodiment, the detector module is a solid-state detector module. Each roughened crystal 10 is wrapped on all surfaces except the surface or surface portion optically coupled to a photodetector 32, in a specular reflective layer 30 (e.g., Vikuiti™ by 3M or some other suitable specular reflector material). One or more roughened crystals 10 are arranged in an array (e.g., 1×1, 2×2, 3×3, 4∴4, etc.) that is coupled to one or an array of the detectors 32 that registers scintillation events in the crystal(s) and transmits scintillation event data (e.g., magnitude, timestamp, etc.) to the detector module for further transmission to the reconstruction processor for storage and reconstruction into an image of a scanned subject. In one embodiment, the scintillators 16 are coupled to the photodetector(s) 32 via a light guide 34. It will be appreciated that, according to one embodiment, the photodetector 32 includes a photodiode. In another embodiment, the photodetector 32 includes a silicon photomultiplier (SiPM) device.

The specular reflector 30 comprises multiple layers, e.g., 40-100 layers in one embodiment, of very thin polymer materials with different indices of refraction. When working with, for instance, LYSO crystals that have a peak light output at 430 nm, the specular reflector is optimized to reflect light in the 400-550 nm range. In other embodiments, the specular reflector is optimized to reflect light in a range that encompasses a peak light output of a particular crystal being employed.

In one embodiment, the specular reflector is the Vikuiti™ product made by 3M. In another embodiment, the specular reflector includes a plurality of alternating layers of different materials, each of the different materials having a different angle of reflection.

The described scintillator crystals 10, each having a roughened side, are employed in the scanner 22, which may be a functional scanner. In one embodiment, the functional scanner is a PET scanner. As is known in the art, when an electron and positron meet, they annihilate, emitting two 511 keV gamma rays that are oppositely directed in accordance with the principle of conservation of momentum. In PET data acquisition, two substantially simultaneous 511 keV gamma ray detection events are presumed to have originated from the same positron-electron annihilation event, which is therefore located somewhere along the "line of response" (LOR) connecting the two substantially simultaneous 511 keV gamma ray detection events. This line of response is also sometimes called a projection, and the collected PET data is referred to as projection data. In conventional PET, substantially simultaneous 511 keV gamma ray detection events are defined as two 511 keV gamma ray detection events occurring within a selected short time window, such as within three nanoseconds of each other. Due to the variable annihilation position with respect to the detector elements a small (up to three nanoseconds) time difference between the substantially simultaneous gamma photon detection events occurs.

In another embodiment, the PET scanner is a time-of-flight (TOF) PET scanner. TOF PET imaging takes advantage of the small time difference inherent to the variable annihilation position with respect to the detector elements to further localize the positron-electron annihilation event along the line-of-response. In general, the annihilation event occurred along the projection at a point closer to the gamma ray detection event that occurred first. If the two gamma ray detection events occur simultaneously within the time resolution of the detectors, then the annihilation event occurred at the midpoint of the projection.

In another embodiment, the functional scanner is a single photon emission computed tomography (SPECT) scanner. In SPECT imaging, one or more radiopharmaceuticals or radioisotopes are administered to the imaged subject such that emission radiation is emitted therefrom, as discussed above. Detector heads mounted to a rotating gantry are rotated around the subject to detect radiation from a plurality of directions, each direction being defined by a collimator that is coupled to the detector head. The detector heads may rotate around the imaging subject in a revolution taking scans at multiple discrete or continuous locations along revolution. Alternatively, the detector heads may rotate over a smaller arc or make multiple revolutions around the subject. The emission data, projection data or measured sinogram received by the detector heads is reconstructed to generate a SPECT image. Reconstruction techniques employed to reconstruct the emission data may include without limitation iterative reconstruction, Fourier transform-based reconstruction, filtered backprojection, or some other suitable reconstruction technique.

In another embodiment, the functional scanner (SPECT, PET, variants thereof, etc.) is included in a multi-modal scanner device that includes the functional scanner and an additional imaging device, such as a magnetic resonance (MR) imager, a computed tomography (CT) scanner, or the like.

Additionally, it will be appreciated that the scanner detectors (PET, SPECT, etc.) in which the scintillation crystals are employed are solid state detectors, in accordance with one or more embodiments described herein.

Figure 3:
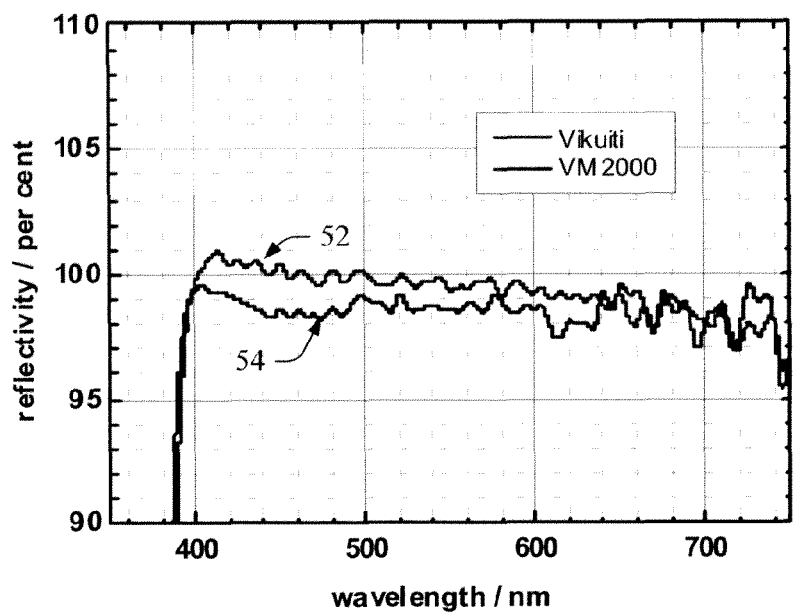
FIG. 3 illustrates a graph showing reflectivity measurements on a specular reflector material, such as 3M Vikuiti™ Enhanced Specular Reflector (ESR).

FIG. 3 illustrates a graph 50 showing reflectivity measurements 52 on a specular reflector material, such as 3M Vikuiti™ Enhanced Specular Reflector (ESR) (blue curve). The specular reflector in this example is a 65 μm thin, 100% polymer film reflector that is specified as 98.5% reflective over the entire visible spectrum, regardless of the angle of incidence. The specular reflector includes on non-absorbing polymer material, using multi-layer optical film technology. The approximately 100% reflectivity in the 400-500 nm range for perpendicular incidence is notably better than that for VM 2000 (black curve 54), which is a previous 3M product shown in the graph 50 for comparison.

Figure 4:
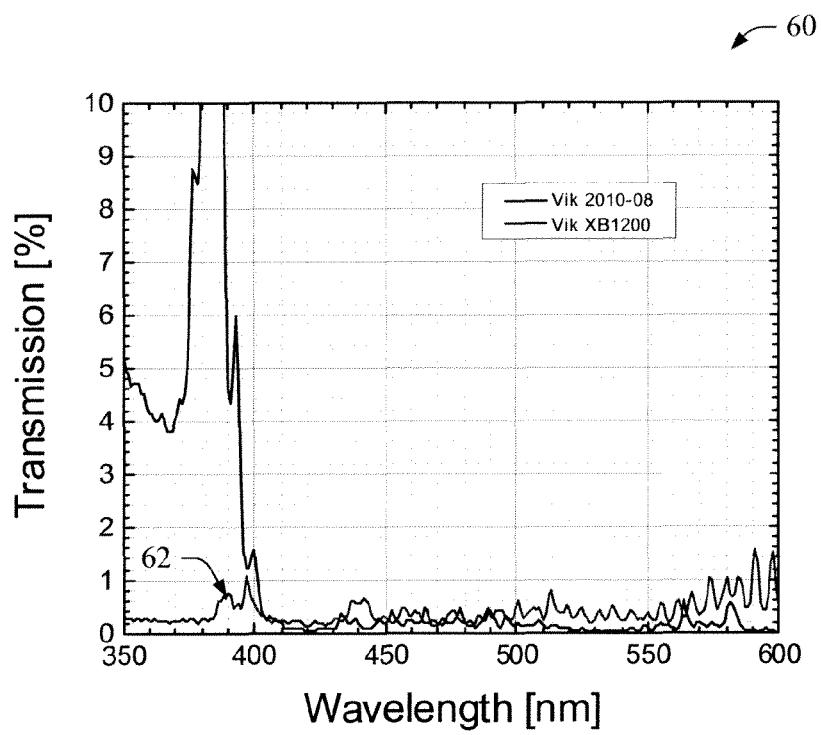
FIG. 4 shows a graph showing transmission measurements on a "blue enhanced" Vikuiti™ material.

FIG. 4 shows a graph 60 showing transmission measurements on a "blue enhanced" Vikuiti™ material (curve 62). This reflector material shows less than 0.5% transmission down to at least 350 nm and is therefore ideally suited as UV and visible light reflector.

Figure 5:
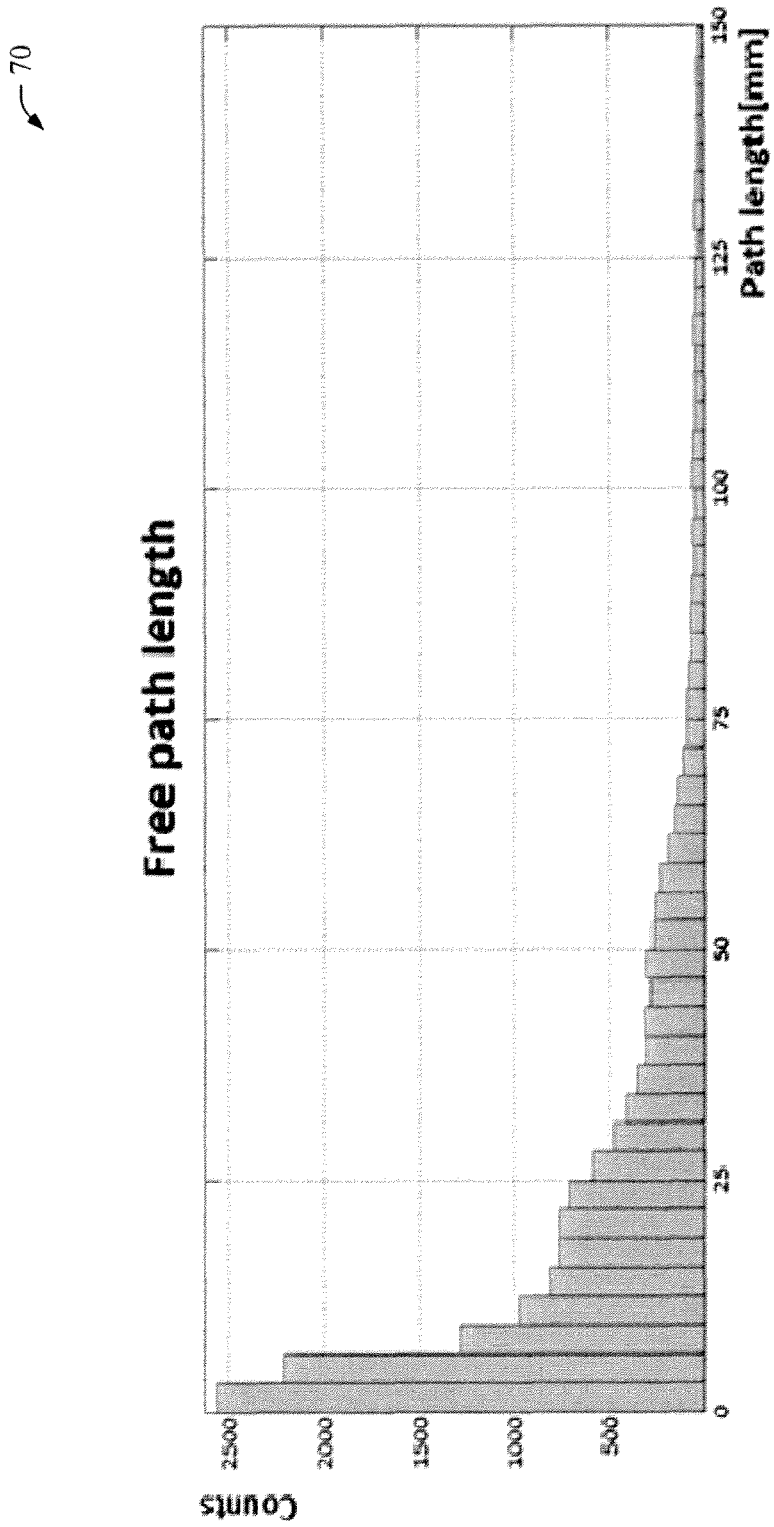
FIG. 5 illustrates a chart showing a Monte Carlo simulation of free path lengths in a 22×4×4 mm solid-state PET crystal.

FIG. 5 illustrates a chart 70 showing a Monte Carlo simulation of free path lengths in a 22×4×4 mm solid-state PET crystal. Path lengths range from 0 mm up to 150 mm, which is several times the crystal length of 22 mm. Such long optical path lengths may inadvertently end up in a state of residual absorption and thereby reduce the achievable light output.

Figure 6:
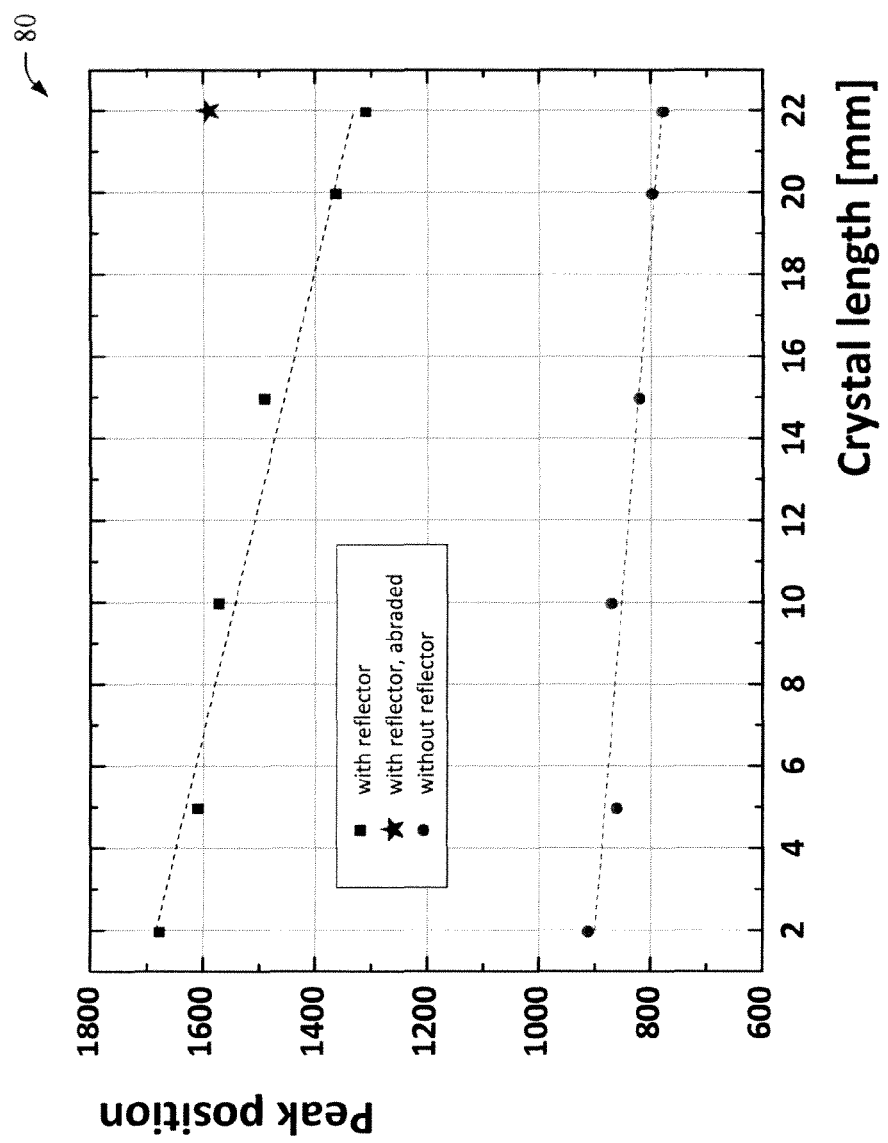
FIG. 6 illustrates a graph showing that roughening of one (top, bottom, or side) surface mitigates the trapping of optical photons in such reflector structures.

FIG. 6 illustrates a graph 80 showing that roughening of one (top, bottom, or side) surface mitigates the trapping of optical photons in such reflector structures. While the light output of polished scintillation crystals wrapped in a reflective material decreases strongly with increasing crystal length, the grinding of one side surface increases the light output of long crystals by approximately 25%, i.e., up to a value achievable with much shorter crystals. In the graph 80, round dots represent polished crystal data. Square dots represent data points for polished crystals wrapped with a reflective material. The "star data" point is for a polished crystal with one side abraded and wrapped with a reflective material. In the illustration of FIG. 6, the 22 mm long crystal with a reflector and an abraded surface has the same light output as a 5 mm crystal with only reflective (non-roughened) surfaces.

Figure 7:
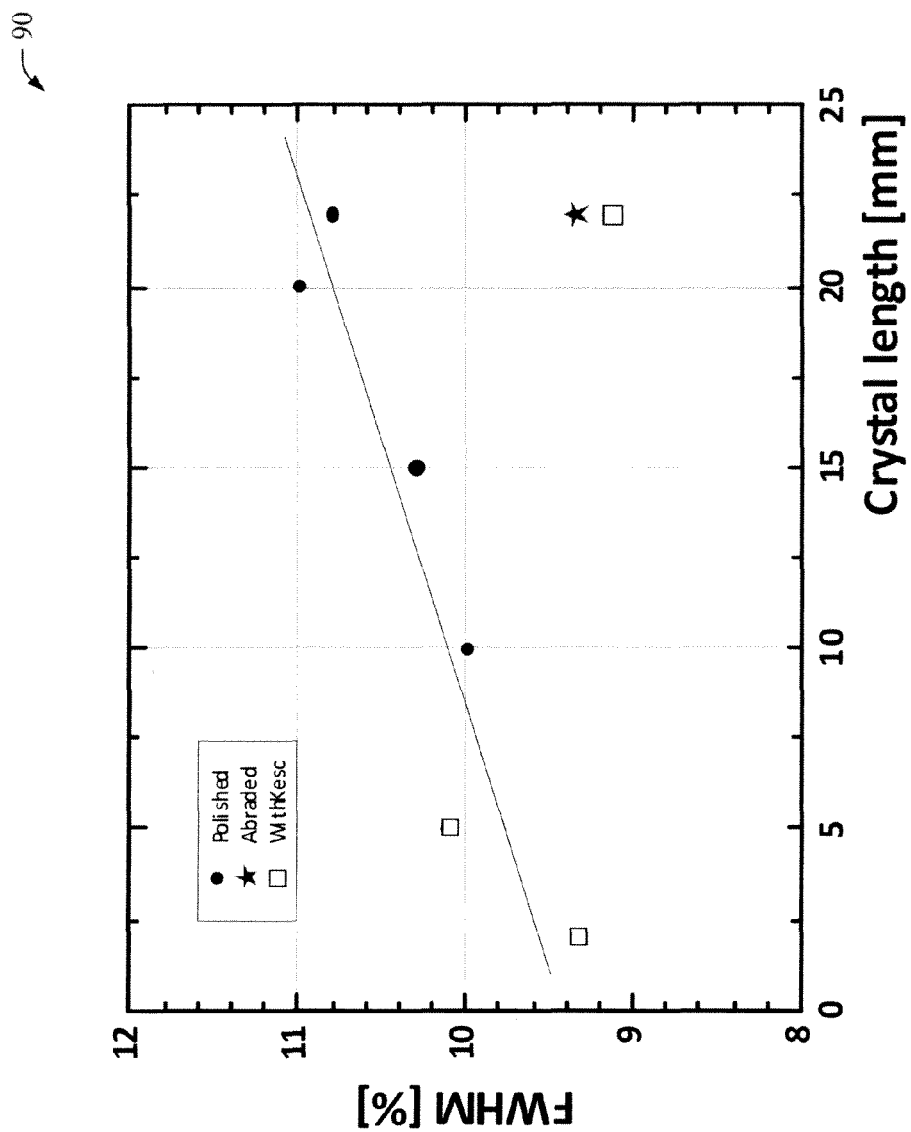
FIG. 7 is a graph showing energy resolution measured on scintillation crystals of different length.

FIG. 7 is a graph 90 showing energy resolution measured on scintillation crystals of different length. In addition to the enhanced light output, the energy resolution measured on such crystals, which depends strongly on the crystal length in the case of polished crystals, is increased to a value of 9-9.5% via abrasion of one crystal surface. In the graph 90, round dots represent data points for polished crystals wrapped with a reflective material. The "star" data point is for a polished crystal with one side abraded and wrapped with a reflective material. Square dots represent data evaluated with separation of the K-fluorescence peak which can only be done with appropriately high energy resolution.

Figure 8:
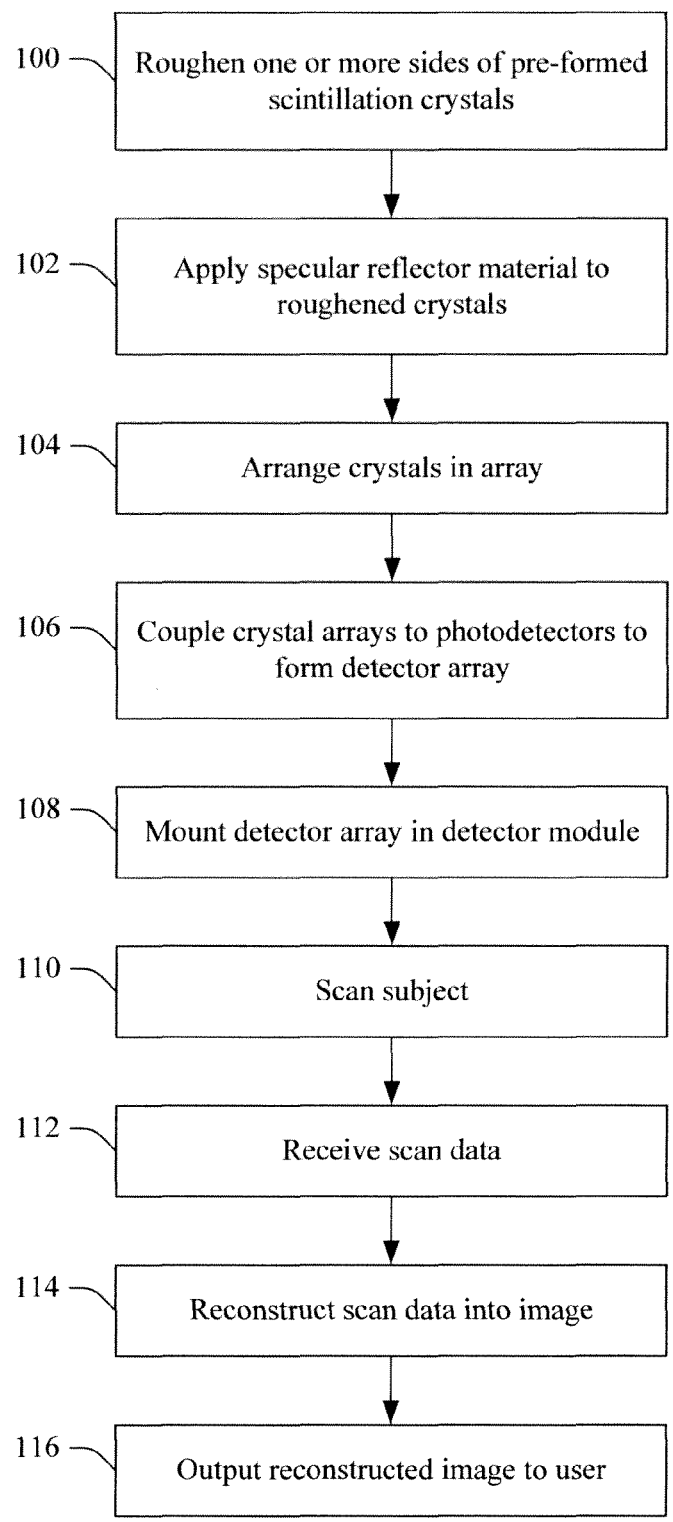
FIG. 8 illustrates a method of increasing efficiency in a scintillator crystal by roughening one side thereof to mitigate trapping light in the crystal, in accordance with various aspects described herein.

FIG. 8 illustrates a method of increasing efficiency in a scintillator crystal by roughening one side thereof to mitigate trapping light in the crystal, in accordance with various aspects described herein. At 100, one or more sides of each of a plurality of polished scintillator crystal is roughened. Roughening can be performed by e.g. sanding, grinding, cutting, abrading, applying a slurry, depositing additional crystal material, or any other suitable technique. In one embodiment, the crystal surface is roughened using a wet-sanding technique that employs a 150-grit silicon carbide (SiC) abrasive. It will be appreciated that more than one side of each crystal may be roughened. At 102, a specular reflector material is applied to all surfaces of each crystal except the light output surface or surface portion. For instance, the specular reflector material can be directly deposited on the crystals, applied via an evaporative process, wrapped around the crystals, or otherwise applied to the crystals. The specular reflector material is optimized, designed, selected, etc., to reflect light in a range that brackets or encompasses a peak light output wavelength of the crystal material being used. For instance, if LYSO crystals are used, then the specular reflector is selected or optimized to reflect light in e.g., a range of 350 nm-500 nm, since the peak output wavelength of LYSO is approximately 430 nm.

At 104, the crystals are arranged in an array (e.g., a 1×1 array comprising one crystal, a 2×2 array comprising four crystals, etc., depending on the particular application of the detector array in which the crystals are to be employed). At 106, each array of crystals is coupled to an array of photodetectors (e.g., a silicon photomultiplier or the like), and a detector array is formed that includes a plurality of the crystal arrays and their respective photodetectors. The scintillators and the photodetectors can be coupled in a 1:1 ratio. However, having fewer or more photodetectors than scintillators is also contemplated. At 108, the detector array can be mounted to a detector module that is employed in a functional scanner, such as a PET scanner, a SPECT scanner, a multi-modal scanner, or the like. At 110, a subject is scanned. At 112, scan data is received. At 114, the scan data is reconstructed into an image. At 116, the reconstructed image is presented to a user or viewer.

Figure 9:
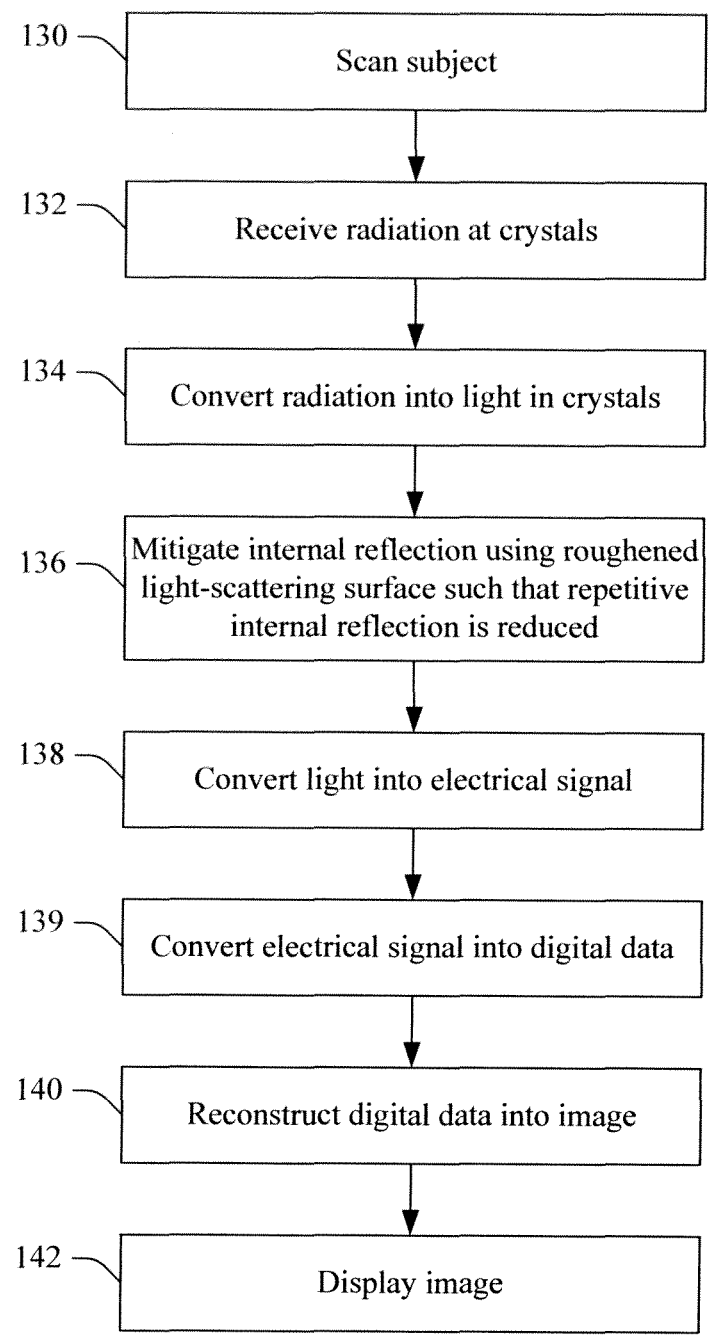
FIG. 9 illustrates a method of generating an image while reducing repetitive internal light reflection in scintillator crystals used to acquire scan data, in accordance with one or more aspects described herein.

FIG. 9 illustrates a method of generating an image while reducing repetitive internal light reflection in scintillator crystals used to acquire scan data, in accordance with one or more aspects described herein. At 130, a subject is scanned (e.g., using a PET scanner, a SPECT scanner, or the like). At 132, radiation emitted from the subject is received at the scintillation crystals. At 134, the radiation is converted to light within the crystals. At 136, repetitive internal reflection of the light within each crystal is reduced using a roughened light-scattering surface on each crystal. The light-scattering surface is roughened using one or more of the techniques described herein. At 138, the light is converted into electrical signal data. At 139, the electrical signal data is converted into digital data. At 140, the digital data is reconstructed into an image of the subject. At 142, the reconstructed image is displayed to a viewer.

The innovation has been described with reference to several embodiments. Modifications and alterations may occur to others upon reading and understanding the preceding detailed description. It is intended that the innovation be

Having thus described the preferred embodiments, the invention is now claimed to be:

1. A radiation detector array for a nuclear scanner, including:
   at least one array of scintillator crystals, each crystal having at least one treated surface, which is treated by roughening to scatter incident light;
   a specular reflective layer wrapped around each scintillator crystal; and
   at least one photodetector coupled to each array;
   wherein the specular reflective layer is optimized to reflect light in a range that encompasses a peak light output wavelength of the scintillator crystals.

2. The detector array according to claim 1, wherein the scintillator crystals include one or more of:
   Lutetium Yttrium Oxy-Orthosilicate (LYSO) crystals;
   Lutetium Oxy-Orthosilicate (LSO) crystals;
   Lutetium Gadolinium Oxy-Orthosilicate (LGSO) crystals;
   Lutetium Gadolinium Yttrium Oxy-Orthosilicate (LGYSO) crystals; and
   Lanthanum Bromide (LaBr) crystals.

3. The detector array according to claim 1, wherein the photodetector is a silicon photomultiplier (SiPM) device.

4. The detector array according to claim 1, wherein the scintillator crystals have a first face that is optically coupled to the photodetector, and a second face opposite the first face and disposed toward an object to be examined, and four side faces.

5. The detector array according to claim 4, wherein each side face has a length between the first and second faces and a width, the length being at least 2.5 times the width.

6. The detector array according to claim 1, wherein the at least one roughened side is a radiation-receiving side of the crystal.

7. The detector array according to claim 1, wherein the at least one roughened side is a side of the crystal that is optically coupled to the photodetector.

8. The detector array according to claim 1, wherein the at least one roughened side of the crystal is long side of the crystal, the long side being a side that is adjacent of a radiation-receiving side and a side that is optically coupled to the photodetector.

9. The detector array according to claim 1, wherein the at least one roughened side has a roughness approximately equal to a roughness achieved by sanding with 150-grit sandpaper.

10. A nuclear scanner, comprising:
    the radiation detector array according to claim 1;
    a reconstruction processor that reconstructs output signals from the photodetectors into an image; and
    a display device that displays the reconstructed image.

11. The detector array according to claim 1, wherein the specular reflective layer comprises at least two different materials having different respective angles of reflection and arranged in alternating layers.

12. A method of increasing light detection in a detector array, including:
    roughening at least one side of each of a plurality of pre-formed polished scintillator crystals;
    applying a specular reflector layer to the roughened crystals;
    arranging the crystals in an array;
    optically coupling each of a plurality of arrays to an array of photodetectors to form a detector array; and
    mounting the detector array in a detector module;
    wherein the specular reflective layer is optimized to reflect light in a range that encompasses a peak light output wavelength of the scintillator crystals.

13. The method according to claim 12, wherein the scintillator crystals include one or more of:
    Lutetium Yttrium Oxy-Orthosilicate (LYSO) crystals;
    Lutetium Oxy-Orthosilicate (LSO) crystals;
    Lutetium Gadolinium Oxy-Orthosilicate (LGSO) crystals;
    Lutetium Gadolinium Yttrium Oxy-Orthosilicate (LGYSO) crystals; and
    Lanthanum Bromide (LaBr) crystals.

14. The method according to claim 12, wherein the photodetectors are silicon photomultiplier (SiPM) devices.

15. The method according to claim 12, wherein roughening at least one side of each of a plurality of pre-formed polished scintillator crystals includes at least one of:
    wet sanding the at least one side of each crystal;
    dry sanding the at least one side of each crystal;
    sandblasting the at least one side of each crystal;
    grinding the at least one side of each crystal;
    exposing the at least one side of each crystal to an abrasive slurry; and
    sputtering additional crystal material onto the at least one side of each crystal.

16. The method according to claim 12, wherein the scintillator crystals have a first face that is optically coupled to the photodetector, and a second face opposite the first face and disposed toward an object to be examined, and four side faces.

17. The method according to claim 12, wherein each side face has a length between the first and second faces and a width, the length being at least 2.5 times the width.

18. The method according to claim 12, wherein the at least one roughened side has a roughness approximately equal to a roughness achieved by sanding with 150-grit sandpaper.

19. The method according to claim 12, further including:
    with the photodetectors, converting light from the scintillation crystals into signals;
    reconstructing the signals into an image; and
    displaying the reconstructed image on a display device.

20. A method of increasing light detection in a functional scanner detector array, including:
    receiving radiation at one or more scintillation crystals, each crystal having a roughened side and four side faces covered with a specular reflective layer that is optimized to reflect light in a range that encompasses a peak light output wavelength of the scintillator crystals;
    converting the radiation into light in the crystal;
    mitigating repetitive internal light reflection in the crystal such that internal reflection is reduced by reflection of the light off of the roughened side;
    converting the light into electrical signal;
    converting the electrical signal into digital data
    reconstructing the digital data into an image; and
    displaying the reconstructed image.

21. The method according to claim 12, wherein the specular reflective layer comprises at least two different materials having different respective angles of reflection and arranged in alternating layers.

* * * * *